R. R. STIELOW.
SEWER PIPE VALVE.
APPLICATION FILED NOV. 7, 1913.

1,119,895.

Patented Dec. 8, 1914.

WITNESSES:
C. M. Albee.
F. B. Stark.

INVENTOR.
Richard R. Stielow.
BY
G. H. Albee.
ATTORNEY.

THE NORRIS PETERS CO., PHOTO-LITHO., WASHINGTON, D. C.

UNITED STATES PATENT OFFICE.

RICHARD R. STIELOW, OF NEENAH, WISCONSIN.

SEWER-PIPE VALVE.

1,119,895.   Specification of Letters Patent.   Patented Dec. 8, 1914.

Application filed November 7, 1913. Serial No. 799,676.

*To all whom it may concern:*

Be it known that I, RICHARD R. STIELOW, a citizen of the United States, residing at Neenah, in the county of Winnebago and State of Wisconsin, have invented a new and useful Sewer-Pipe Valve, of which the following is a specification.

My invention relates to a valve for sewer pipes in cellars for preventing the back flow of water into the cellar when unusually high water prevails, and the invention consists of a flat plate, preferably of cast iron, which is provided with a central opening and a seat for receiving a grating plate, with holes by which it can be bolted to a depression formed in the cement floor of a cellar, and with holes with which a circular plate may be bolted to it upon its under side, said second plate having a valve cage depending therefrom, and being provided with a ball valve therein and a seat for said valve above the same, said valve and cage being arranged in the upper end of the cellar sewer pipe, said invention being shown in the accompanying drawing, in which,—

Figure 1:
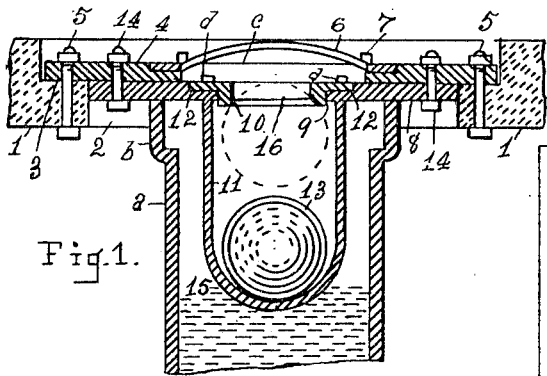
Figure 4:
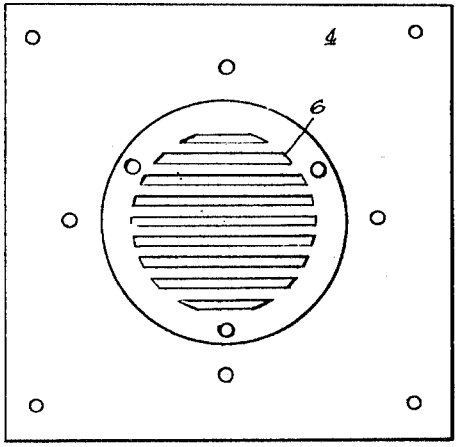
Figure 2:
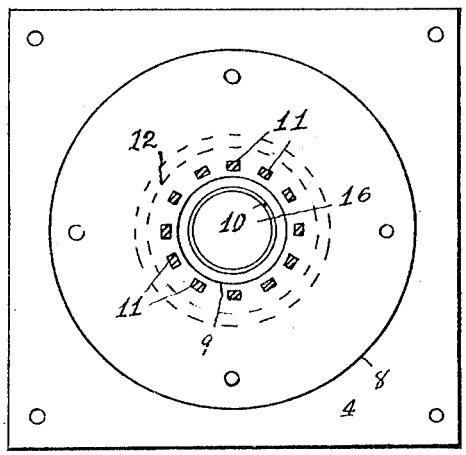
Figure 5:
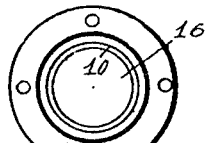
Figure 3:
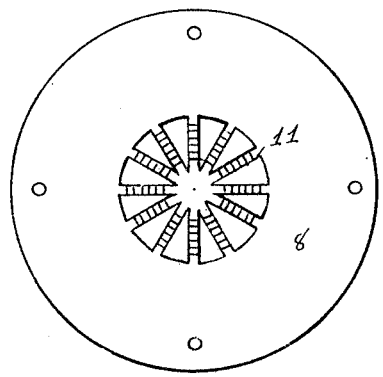

Figure 1 is a vertical section through the cement floor of a a cellar, with the invention applied over the upper end of a section of sewer pipe. Fig. 2 is a plan of the under side of both, the upper and lower plates, fitted for being bolted to the opening in the cement floor. Fig. 3 is a plan of the under side of the lower and circular plate with its valve cage. Fig. 4 is a plan of the upper side of the upper plate, and a grating over its central opening. Fig. 5 is a plan of the lower side of a removable valve seat.

Similar numerals and letters indicate like parts in the several views.

1, indicates the cement floor of a cellar; 2, an opening therein for the projection into it of a section of sewer pipe $a$; $b$, indicating the flange around its upper end; 3, a depression or rabbet, around the opening 2, for receiving the upper metal plate 4; 5, bolts by which the plate 4, can be bolted to the cement floor; 6, a grating for covering the opening $c$, in the plate 4; 7, bolts for securing the grating in position; 8, a circular plate of a diameter for extending over the sewer pipe end, it having a centrally arranged circular opening 9, within which is a valve seat 10, and a cage 11, depends from said plate. The plate and cage, may be integral, but the valve seat is a separate casting, and is formed of brass or some other non-corrosive metal, as a more perfect seat can be formed and one that will continue to present a perfect valve seat for a longer time than one formed of cast iron. A rabbet 12, is formed in the plate for receiving the valve seat flange, and bolts $d$, are provided for securing the valve seat ring and plate 8, together.

Suspended from the under side of the plate 8, is a cage 11, for sustaining a ball valve 13. Bolts 14 are provided for securing the upper and lower plates together.

It should be observed that the valve seat which must necessarily be formed of a metal costing several times as much as the other metallic parts of a like weight, is of small dimensions and its cost will be little, and furthermore, that the several parts, the bolts excepted, have no threaded surfaces screwing one into the other, so that rusty screw joints between the several parts do not occur in the assemblage.

The action of the device is as follows: Water 15, rising in the sewer pipe in a cellar, can rise to and a little above the lower side of the ball valve without disturbing it, but if it rises so as to lift the valve into the position indicated in dotted lines, it will close the opening 16 and prevent its further rising.

The valve is preferably to be formed of rubber or of some other soft material not easily affected by water, and that will form a water tight seat.

Having described my invention, what I claim and desire to secure by Letters Patent, is,—

1. In combination with a sewer pipe having a flanged upper end extending upward into the floor of a cellar, a plate formed with a centrally arranged circular opening above said flanged end and adapted to be secured in position above said sewer pipe, a rabbeted seat formed around said central opening, a valve cage depending from around said opening and integral with said plate, a floatable valve supported within said cage and a ring plate secured within the rabbeted seat having a valve seat upon the lower side thereof.

2. In combination with a sewer pipe having a flanged upper end extending upward into the floor of a cellar, of a plate formed with a centrally arranged circular opening above said flanged end and adapted to be secured to said floor, a second plate having a centrally arranged opening, mounted over and upon the sewer pipe and concentrically with the opening in the first named plate and secured upon the lower side thereof, a rabbeted seat formed around the central opening in said second named plate, a valve cage integral with, and depending from said second named plate, a floatable valve supported within said cage and a ring plate having a valve seat upon its lower side, secured within said rabbeted seat of the second named plate.

RICHARD R. STIELOW.

Witnesses:
C. M. ALBEE,
FLORENCE B. STARK.